Figure 1:
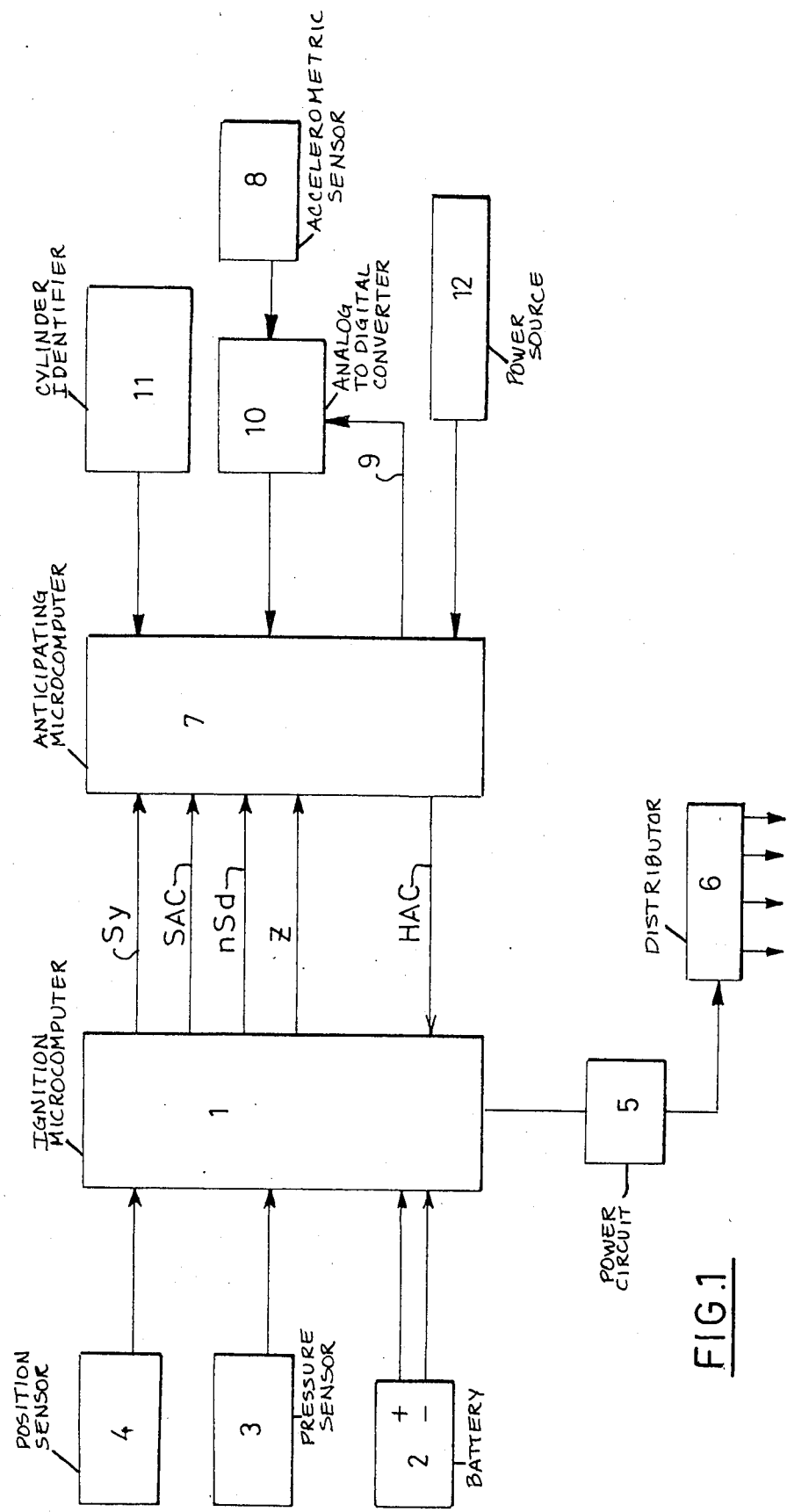

United States Patent [19]

Korb et al.

[11] Patent Number: 4,631,680

[45] Date of Patent: Dec. 23, 1986

[54] PROCESS FOR OPTIMIZING THE IGNITION ADVANCE OF AN INTERNAL COMBUSTION ENGINE

[75] Inventors: Jean P. Korb, Joinville Le Pont; Jean P. Lagrue, Palaiseau, both of France

[73] Assignee: Regie Nationale des Usines Renault, Boulogne Billancourt, France

[21] Appl. No.: 511,946

[22] Filed: Jul. 8, 1983

[30] Foreign Application Priority Data

Jul. 20, 1982 [FR] France ............... 82 12628

[51] Int. Cl.$^4$ ................. F02P 5/15; G06F 15/20
[52] U.S. Cl. ................. 364/431.05; 123/425; 364/431.08
[58] Field of Search ........... 364/431.04, 431.05, 364/431.08; 123/416, 417, 418, 419, 422, 425

[56] References Cited

U.S. PATENT DOCUMENTS

| | | | |
|---|---|---|---|
| 4,233,944 | 11/1980 | Omori et al. | 123/425 X |
| 4,268,910 | 5/1981 | Omori et al. | 123/425 X |
| 4,269,155 | 5/1981 | Iwata et al. | 123/425 |
| 4,282,841 | 8/1981 | Tagaki et al. | 123/425 |
| 4,300,503 | 11/1981 | Deleris et al. | 123/425 |
| 4,321,580 | 3/1982 | Deleris | 340/870.24 |
| 4,331,117 | 5/1982 | Ginsburgh | 123/425 |
| 4,354,378 | 10/1982 | Oshiage et al. | 123/425 X |
| 4,367,531 | 1/1983 | Furuhashi et al. | 123/425 X |
| 4,370,964 | 2/1983 | Muranaka et al. | 123/425 |
| 4,376,429 | 3/1983 | Youngblood | 123/425 |
| 4,388,902 | 6/1983 | Latapie | 123/425 |
| 4,413,599 | 11/1983 | Shigematsu et al. | 123/425 |
| 4,428,344 | 1/1984 | Focht | 123/425 |
| 4,472,776 | 9/1984 | Deleris et al. | 364/431.12 |

Primary Examiner—Felix D. Gruber
Attorney, Agent, or Firm—Oblon, Fisher, Spivak, McClelland, & Maier

[57] ABSTRACT

A process whereby, as a function of the speed and the load of the engine, at least two operating zones are determined, namely a critical zone and a noncritical zone and, in case of detection of pinging in the critical zone, the ignition advance generated during at least one of the following engine strokes is delayed. More precisely, in response to the detection of pinging of a cylinder in the critical zone, the ignition advance of the cylinder is delayed by $n_1+n_2$ degrees in relation to the programmed law of advance and the return to the programmed advance of said cylinder is controlled at a fast rate of return and a slow rate of return by decrement of $n_1$ at a high speed and of $n_2$ at a slow speed respectively and, in the presence of a fast rate and/or slow rate correction during a passage from the critical zone to the noncritical zone, the fast rate of return correction is cancelled, the slow rate state is stored, and the advance correction and the decrement of $n_2$ of the slow rate are suspended until the following passage from the noncritical zone to the critical zone where the correction and the decrement of $n_2$ at the slow rate is resumed.

13 Claims, 4 Drawing Figures

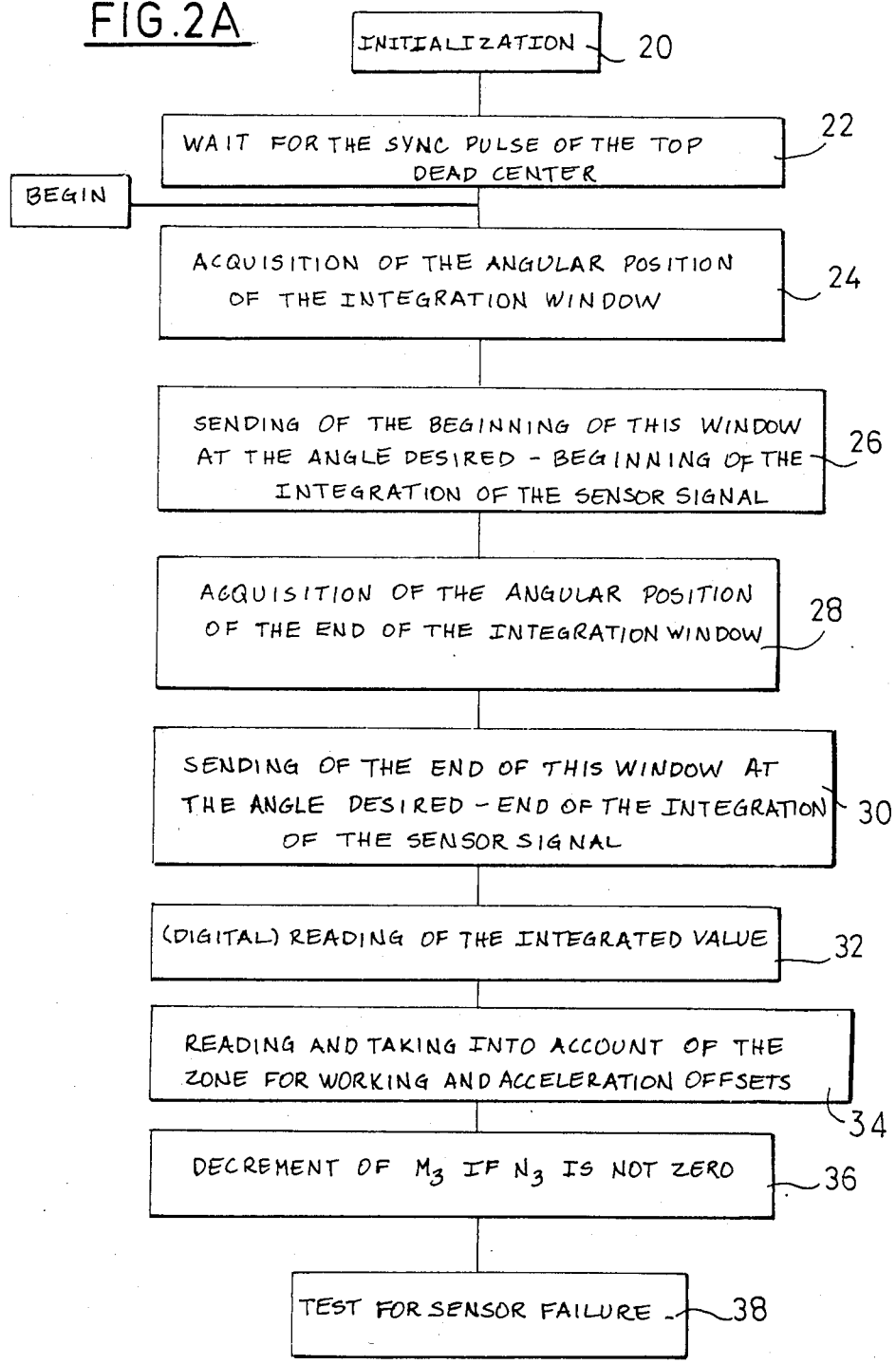

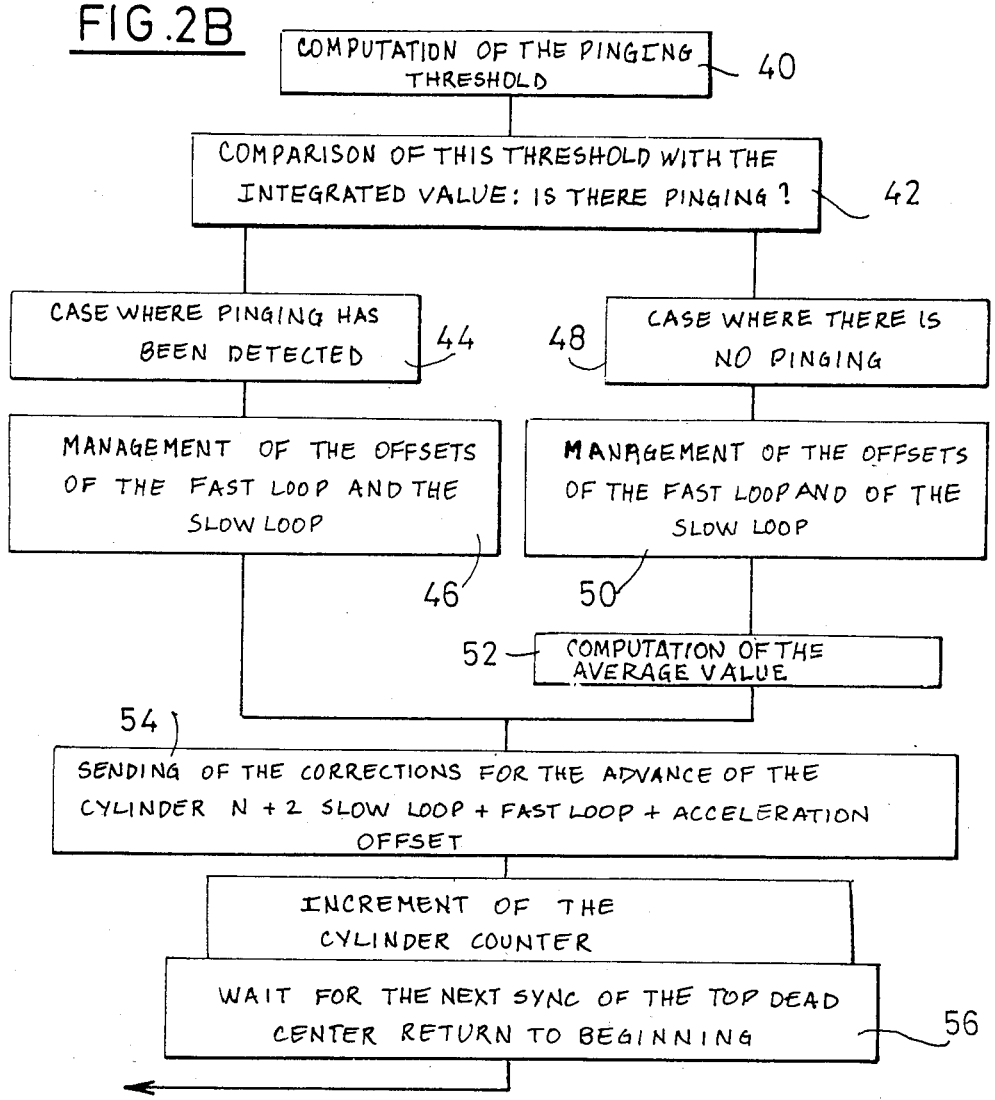
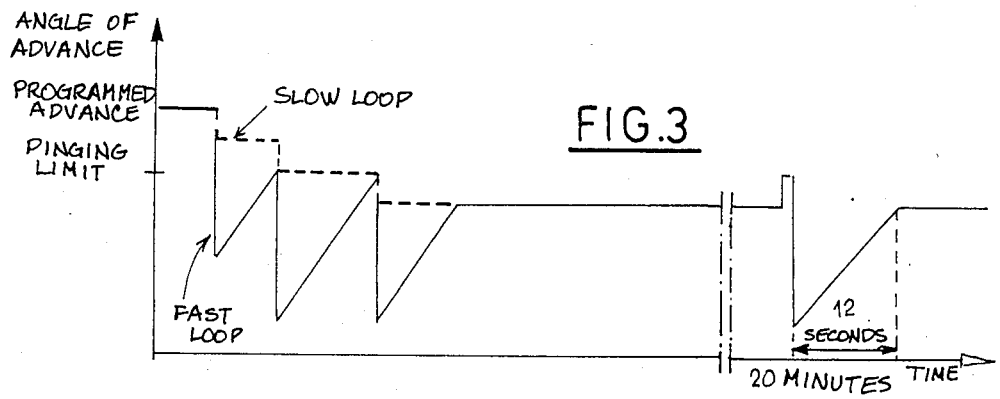

PROCESS FOR OPTIMIZING THE IGNITION ADVANCE OF AN INTERNAL COMBUSTION ENGINE

BACKGROUND OF THE INVENTION

1. Field of the Invention

This invention relates to a process for optimizing the ignition advance of an internal combustion engine.

2. Description of the Prior Art

U.S. Pat. No. 4,268,910 describes a process for optimizing the ignition advance of an internal combustion engine equipped with a computer containing a programmed law for ignition advance as a function of the speed and the load of the engine and for a system for detecting pinging which supplies data representative of the presence or absence of pinging at each engine stroke, according to which there are determined, as a function of the speed and the load of the engine, at least two operating zones, namely a critical zone and a noncritical zone. When pinging is detected in the critical zone, the ignition advance generated for at least one of the following engine strokes is delayed. The process makes it possible to avoid the correction as a function of the pinging taking place regardless of the load and the speed of the engine. Thus, for example, if a pinging stroke appears and is corrected at full load (critical zone) and if the full load is released before the return to the programmed law, to return to partial load (noncritical zone), correction is no longer made and the programmed law for ignition advance corresponding to the supply of the maximum torque of the engine for the speed and the load under consideration is immediately resumed.

However, this process does not make it possible, in the critical zone where the risk of pinging is greatest, to avoid a return to the programmed advance that is too fast. Now if, under certain operating conditions of the engine, this programmed advance is near or coincides with the pinging limit, which can be the case as the engine ages, there will be a new pinging stroke each time the angle of advance returns to the initial law. If these pinging strokes are too numerous, then there is risk of damaging the engine.

In an attempt to solve this problem, the U.S. Pat. No. 4,233,944 describes a process according to which, after a pinging stroke, the advance is delayed and this delay is maintained longer the more stable are the operating conditions of the engine. On the other hand, the programmed advance is returned to short time operation as soon as the engine operates during transient operating conditions. However, this solution is not satisfactory either because the protection of the engine is poorly assured during the transient operations, some of which exhibit high risks of pinging.

SUMMARY OF THE INVENTION

The present invention eliminates these drawbacks and, for this purpose, has as its object a process for optimizing the ignition advance of an internal combustion engine equipped with a computer containing a programmed law for ignition advance as a function of the speeds and the load of the engine and for a system for detection of pinging that supplies data representative of the presence or absence of pinging at each engine stroke, according to which there are determined, as a function of the speed and the load of the engine, at least two operating zones, namely a critical zone and a noncritical zone. When pinging is detected in the critical zone, the ignition advance generated at, at least one of the following engine strokes is delayed. The present invention provides, that, in response to the detection of pinging of a cylinder in the critical zone, the ignition advance of the cylinder concerned is delayed by $n_1 + n_2$ degrees in relation to the programmed law of advance and the return to the programmed advance of said cylinder is controlled by a high speed or rate decrement of $n_1$ and by a low speed or rate decrement of $n_2$. These fast and slow return paths for the portions $n_1$ and $n_2$ of the delayed ignition advance $(n_1 + n_2)$ are referred to as a fast rate and a slow rate respectively. In the presence of a fast rate and/or slow rate correction during a passage from the critical zone to the noncritical zone, the fast rate correction is cancelled, the value of $n_2$ corresponding to the slow rate state, is stored, and the advance correction and the decrement of $n_2$ is suspended at the slow rate until the following passage from the noncritical zone to the critical zone where the correction and the decrement of $n_2$ are resumed at the slow rate. As a result of this process, in the critical zone, there is superposed, on a standard correction in a fast rate, a second correction (slow rate) which is interrupted when a noncritical zone is passed through, then resumed if a critical zone is then returned to. As a result of this process, a "learning" by the ignition system is assured which allows it to adapt to developments over time of the operating characteristics of the engine, without penalizing the engine in the noncritical zone where the risks of pinging are low, while protecting it and maintaining an advance near the maximum torque in the "risk" zone which is the critical zone.

Preferably, in response to the detection of pinging of a cylinder in the noncritical zone, the ignition advance of the cylinder concerned is delayed by $n_1$ degrees and a gradual decrease of this delay is controlled at the fast rate by decrement of $n_1$ at high speed. This correction in the fast loop in the noncritical zone is a precaution against improbable pinging strokes which nevertheless could appear in this zone.

According to one embodiment, $n_1$ is preferably between 3 and 8 degrees and is decremented at the fast rate of one degree every $m_1$ engine strokes, $m_1$ preferably being between 12 and 25, and $n_2$ is preferably equal to 1 and is decremented at the slow rate of one degree every $m_2$ engine strokes, $m_2$ preferably being between 300 and about 65,000.

Thus, for a detected stroke of pinging, the advance of $n_1$ degrees, 7 degrees for example, is set back and the initial advance minus $n_2$ degrees is quickly resumed, in 12 seconds for example. Then the initial advance is resumed in a much longer time, on the order of 10 to 20 minutes, as a function of the selected $m_2$ value and the engine speed. Once the setback of advance is sufficient for the engine to operate at the limit of the pinging, there will be no more than one pinging stroke every 10 to 20 minutes, instead of a much greater frequency with the known processes.

On the other hand, it is known that the law of advance is programmed to produce the maximum torque. However, the pinging phenomenon can appear for some cylinders before the maximum torque. For this reason, in the case of a law of advance common to all the cylinders, this law is brought into line with the cylinder the most susceptible to pinging, at the expense of the other cylinders and therefore at the expense of the maximum torque supplied by the engine. The invention makes it possible to avoid this drawback as a result of the fact that, as known in the art, the programmed law of advance is common to all the cylinders of the engine, whereby each cylinder is treated individually with regard to detection of pinging and the correction at the slow and/or fast rates of the programmed advance. Since the learning is done cylinder by cylinder, there can be drawn up, if necessary, a law of ignition advance that is in line with the cylinder least susceptible to pinging. In an initial phase, the system learns for each cylinder, at each pinging stroke, how many degrees the advance must be offset to eliminate the pinging. Therefore, each cylinder operates at its pinging limit and the engine torque is the best that can be obtained without pinging. Moreover, this adaptation takes into account the variations in the pinging limits as a function of the age of the engine.

According to another characteristic, during a passage from the noncritical zone to the critical zone, a cumulative acceleration correction is performed with the corrections of the slow and fast rates by delaying the ignition advance by $n_3$ degrees for all the cylinders, $n_3$ preferably being between 4 and 8, and this delay is cancelled by $n_3$ degrees at the end of $m_3$ engine strokes, $m_3$ preferably being between 12 and 25, and during a passage from the critical zone to the noncritical zone, any acceleration correction in progress is cancelled.

According to yet another characteristic, the system for detection of pinging has an accelerometer rigidly fastened on the cylinder head of the engine, and the accelerometer signal includes, among other things, the integration of the signal within an angular window of determined size is subjected to an analog processing; the integrated signal is converted into digital form, and successively for each cylinder, the integrated accelerometer signal is and then compared converted into digital form with a comparison threshhold, the result of this comparison constituting said data.

A more complete appreciation of the invention and many of the attendant advantages thereof will be readily obtained as the same becomes better understood by reference to the following detailed description when considered in connection with the accompanying drawings, wherein:

FIG. 1 represents, in the form of a block diagram, an electronic control system for ignition advance incorporating the device according to the invention;

FIGS. 2A and 2B together form an operating algorithm for the antipinging microcomputer; and FIG. 3 is a curve illustrating the development of the angle of advance of the ignition advance of a cylinder as a function of time.

Referring now to the drawings, wherein like reference numerals designate identical or corresponding parts, and more particularly to FIG. 1 thereof, the system comprises an ignition microcomputer 1 powered by a battery 2 and which formulates the angle of advance for ignition for each cylinder of an internal combustion engine (not shown) from a programmed law in microcomputer 1 and from data that it receives from a pressure sensor 3 that supplies data representing the low pressure in the intake manifold and from a position sensor 4 that detects the passage of the teeth which are provided on the periphery of a target attached to the crankshaft of the internal combustion engine and that turn in synchronism with it. Microcomputer 1 controls the ignition of the air/fuel mixture in the various cylinders of the engine by a power circuit 5 comprising an ignition coil, and by a distributor 6. The manner in which microcomputer 1 formulates the angle of conduction of the coil and the angle of advance for ignition has been described in U.S. Pat. No. 4,472,776 and therefore will not be taken up again.

Ignition microcomputer 1 is associated with an antipinging microcomputer 7 which receives from an accelerometric pinging sensor 8 an accelerometric signal representative of the noise of the engine.

The accelerometric signal from sensor 8 is integrated during an angular window formulated on a conductor 9 by microcomputer 7 and converted into digital form in a block 10, the value of the noise integrated and converted into digital form in the measurement window being sent to microcomputer 7. A detailed circuit example making it possible to process this value integrated and converted into digital form of the engine noise in U.S. Pat. No. 4,300,503.

Moreover, microcomputer 7 receives signals from a block 11 that enables it to identify each cylinder and, for this purpose, references can be, for example, provided on the cam shaft of the engine. Thus, as will be explained in greater detail in the following description, when the engine is stopped, the offsets of the angle of ignition advance "learned" for each cylinder by the microcomputer 7 can be stored and kept in a memory powered by an electric power source 12 independent from the key position of the ignition switch. During the restarting of the engine, there are no more pinging strokes which occur at the beginning of the "learning".

Finally, microcomputer 7 receives from microcomputer 1 a synchronization signal Sy that intervenes, for example, at each top dead center of a cylinder, a signal SAC that allows microcomputer 7 to apply correction pulses HAC as a function of the pinging to microcomputer 1 and a signal nSd consisting of pulses that intervene at constant angular fractions of the rotation of the crankshaft. The signals Sy, SAC and HAC are described in U.S. Pat. No. 4,472,776, while the signal nSd, which serves microcomputer 7 to formulate the measurement window, is described in U.S. Pat. No. 4,321,580. Finally, microcomputer 1 applies to microcomputer 7 a signal consisting of a "0" or "1" bit depending on whether the engine is operating in a noncritical zone or a critical zone as a function of the load and the speed.

These conditions for the two zones can be programmed in computer 1, either in a specific read only memory addressable by pressure and speed, or by using one of the two binary digits for the external conditions available in read only memory 53 of the computer described in U.S. Pat. No. 4,472,776.

The operation of the antipinging device associated with ignition microcomputer 1 will now be described with reference to the algorithm of FIGS. 2A and 2B and to the curve of FIG. 3.

The system of FIG. 1 has not only a function of protection with respect to pinging, but more generally a regulation function that makes it possible for each cylinder to have an angle of ignition advance as near as possible to its own pinging limit, when this is necessary to obtain the best engine torque.

To do this, in microcomputer 1 an ignition advance curve is stored as a function of the speed and the load of the engine, unique for every cylinder and designed so as to obtain the optimum engine torque, without taking pinging into account.

The strategy for detection and correction, cylinder by cylinder, used by antipinging microcomputer 7, learns and stores for each of the cylinders the number of degrees to be taken away by the general law to prevent pinging in each of the cylinders.

If, in the critical zone, pinging has been detected in a cylinder, the ignition advance of this cylinder is delayed by $n_1$ degrees ($3 \leq n_1 \leq 8$) with a fast return rate to the previous advance at a rate of one degree every $m_1$ engine strokes ($12 \leq m_1 \leq 25$) and by $n_2$ degrees ($n_2 = 1$) with a slow return rate to the preceding advance of $m_2$ engine strokes ($300 \leq m_2 \leq 65,000$), with these two advance setbacks being cumulative.

The fast return rate makes it possible to eliminate the pinging immediately, the offset having to be sufficient to overcome a certain residual amount of pinging.

The slow return rate makes it possible to store the number of pinging strokes in the cylinder and thereby to offset the advance accordingly. Return to the initial law is necessary to be as near as possible to the pinging limit by taking into account the various parameters that cause this pinging limit to develop (temperatures, loads, speeds . . . ). Each cylinder has its fast rate portion and its slow rate portion and therefore its advance angle as near as possible to its pinging limit.

Furthermore, the passage from the noncritical zone to the critical zone, i.e., the passage from "0" to "1" at the input ⇄ of antipinging microcomputer 7, causes this antipinging microcomputer to generate an acceleration correction that is reflected by an offset of the ignition advance of $n_3$ degrees ($4 \leq n_3 \leq 8$) in relation to the slow return rates on all the cylinders, during $m_3$ engine strokes ($12 \leq m_3 \leq 25$). This makes it possible to introduce a pinging clearance at acceleration. During this acceleration correction, the detections and corrections of the fast and slow rates of return operate equally.

With reference to FIG. 2A, the program of the antipinging microcomputer 7 begins with an initialization stage 20 started by the appearance of the signal, coming from block 11, identifying cylinder No. 1. Microcomputer 7 then initializes a cylinder counter to 1.

At the following stage 22, the antipinging microprocessor 7 awaits an edge rising on the signal Sy of ignition microprocessor 1, this edge being synchronous with the top dead center.

When this edge is recognized, the program begins.

Acquisition of the angular position of the beginning of the integration window (stage 24):

Antipinging microprocessor 7 will search its read only memory for a value corresponding to the number of movable degrees desired for the start of the integration window. This value is loaded in an internal counter of the microprocessor. This counter is incremented at each descending edge of the signal nSd, and the overflow from the counter is taken into account by the central unit of the microprocessor 7 as the beginning of the integration.

Beginning of the integration of the sensor signal (stage 26):

At the beginning of the window, the central unit controls the analog channel 10 so that the integration of the signal from the accelerometer 8 can be performed.

Acquisition of the angular position of the end of the integration window (stage 28):

The process is absolutely identical with the acquisition of the beginning of the integration window.

End of the integration of the sensor signal (stage 30):

At the end of the integration window, the central unit controls the analog channel 10 so that the integration of the sensor signal stops.

Reading of the integrated value $x_n$ (stage 32):

This reading is done by sampling the analog to digital converter 10. As a variant, it can be performed by constant current discharge of a capacitor, previously charged with an analog voltage proportional to the noise in the window. The time necessary for the discharge is counted by the clock of the microcomputer, this time being proportional to the value of the noise received by the accelerometer. The value, integrated and converted into digital form, of the accelerometric signal in a window n is designated $x_n$.

Reading and taking into account of the working zone (stage 34):

The critical zone data, corresponding to a certain operating zone of the engine for speed and load, is defined in microcomputer 1 and read in the form of a bit at the input ⇄ of antipinging microcomputer 7. One is in the critical zone when the bit is at "1", and in the noncritical zone if the bit is at "0".

(a) If one is in the noncritical zone and at the preceding top dead center one was also in the noncritical zone, the noncritical zone state is stored, a possible pinging stroke is detected and it is corrected in the fast rate (delay of $n_1$ degrees and return in $m_1$ engine strokes);

(b) If one is in the noncritical zone and at the preceding top dead center one was in the critical zone, the slow rates state are stored, the fast rate state and the acceleration corrections are set to zero, but the offset for advance of the slow rate is no longer made. If a pinging stroke is detected, a correction in the fast rate is made.

(c) If one is in the critical zone and at the preceding top dead center one was in the noncritical zone:

the slow rates or rate which can be cumulative to correct the advance are taken into account again and the counting of the engine strokes for the return to the programmed advance is resumed;

the possible pinging is detected and corrected by the initialization of new fast and slow rates;

an acceleration correction is initialized, with read only memory reading of an angle $n_3$ for a correction period $m_3$, this correction adding a certain number of degrees (4) to the existing slow loops.

(d) If one is in the critical zone and at the preceding top dead center one was in the critical zone:

the slow rates of return and the fast rates of return are decremented by a number of strokes to return to the initial advance, and by degrees.

the pinging is detected and the slow and fast rates are reinitialized in case of pinging.

Moreover, regardless of the zone, the average value of the noise is calculated in the case where there is no pinging.

Decrement by $m_3$ (stage 36):

If one is in the critical zone, the number $m_3$ is decremented at each stroke, if $n_3$ is not zero. If $m_3$ has been totally decremented, the acceleration correction is cancelled.

Test for sensor failure (stage 38):

If the noise $x_n$ is less than a certain threshhold and has an identical value from one cylinder to another for a given number of engine revolutions, it is because the sensor is broken. In this case, microcomputer 7 offsets the ignition advance of all the cylinders by $n_4$ degrees ($n_4 = 6$) in relation to the general law for protection from the pinging strokes that can then no longer be detected.

Computation of the pinging threshhold (stage 40):
This threshhold has a value:

$$S = a\bar{x}_n + b$$

where $\bar{x}_n$ is the average value of the noise for the cylinder under consideration, a and b are constants:
$15 \leq a \leq 70$
$1.25 \leq b \leq 2.25$ Two means for computing $\bar{x}_n$ can be applied: there is a different average for each cylinder, calculated for each engine stroke.

(1) There is selected $\bar{x}_n = \bar{x}_{n-1} + 1/K(x_n - \bar{x}_{n-1})$
where:
$\bar{x}_n$ is the average value of the noise after this stroke,
$x_n$ is the value of the noise in this stroke,
K is a constant representing a filtering value.
There is for example K=2 if $x_n > \bar{x}_{n-1}$ and K=4 if $x_n \leq \bar{x}_{n-1}$ (2) If $$x_n < \bar{x}_{n-1} - \frac{\bar{x}_{n-1}}{4},$$

$\bar{x}_n = \bar{x}_{n-1} - \Delta$ is selected
where $\Delta$ is a fixed constant value, equal to 4, that makes it possible to "follow" the engine noises with lowering speed, therefore by noise.
If $$\bar{x}_{n-1} > x_n \geq \bar{x}_{n-1} - \frac{\bar{x}_{n-1}}{4},$$

$\bar{x}_n = \bar{x}_{n-1}$ is selected.
If $x_n \geq \bar{x}_{n-1}$ $$\bar{x}_n = \frac{x_n + \bar{x}_{n-1}}{2}$$

is selected, which assures a following of the engine noises by increase of noise, with a filtering equal to 2.

This last process makes it possible to follow the peak value of the engine noise and especially to simplify the computations inside microcomputer 7.

Comparison of the threshhold S with the integrated value (stage 42):
$x_n$ being the integrated value representative of the noise in the integration window,
if $x_n \geq S$, there is pinging;
if $x_n < S$, there is no pinging.

(1) In case of pinging (stages 44 and 46), the following operations are performed:
in the critical and noncritical zones:
increment of the fast loop by $n_1$ degrees for the cylinder under consideration, with $3 \leq n_1 \leq 8$;
loading of the number $m_1$ in storage for the cylinder concerned, with $12 \leq m_1 \leq 25$ engine revolutions;
in the critical zone only:
increment of the slow rate state by $n_2$ degrees for the cylinder concerned, with $n_2 = 1$;
loading of the number $m_2$ in storage for the cylinder concerned, with $300 \leq m_2 \leq 65,000$ engine revolutions.

A new average value is not calculated:

$$\bar{x}_n = \bar{x}_{n-1},$$

this is done so as to not take into account a noise representative of pinging in a representative average of engine noise.

(2) The case where there is no pinging (stages 48 to 52):
The numbers $m_1$ and $m_2$ pertaining to the cylinder concerned are decremented at each stroke that is located in the critical zone (if the numbers $n_1$ and $n_2$ are not zero). If $m_1$ or $m_2$ have been totally decremented, the corresponding loop is decremented by 1 degree and the speed storage is reloaded to its maximum value $m_1$ or $m_2$ unless $n_1$ or $n_2$ is zero.

The speed is expressed in the number of engine strokes. A value representative of the number of strokes to be performed is loaded in storage before decrementing the loop by 1 degree. The number of cycles that remain to be done is decremented each stroke.

Then a new average value $\bar{x}_n$ is calculated according to one of the two processes previously described.

Sending of corrections (stage 54):
A number of positive pulses equal to the number of degrees of offset desired, in relation to the law of general advance, for the cylinder concerned is sent to ignition microcomputer 1. Therefore, at the maximum there is:

Offset angle=Slow rate offset angle+Fast rate offset angle+Acceleration offset angle.

Increment of the cylinder counter (stage 56):
One goes on to the following cylinder and awaits the next top dead center.

Of course, numerous modifications can be brought to the invention without going outside its scope. Thus, if the pinging limits are about the same from one cylinder to another, there can be a slow rate of return common to all the cylinders and a fast rate of return pertaining to each cylinder.

Likewise, if the noises from one cylinder to another are very close, there can be an average value $\bar{x}_n$ and a threshhold S common to all the cylinders.

Moreover, in the case where a system 11 for referencing or identification of the cylinders is not available, even the slightest offset of the slow loops can be stored when the engine has stopped and then it can be applied to all the cylinders when the engine is restarted. Because of this, the learning is done more rapidly, i.e., with fewer pinging strokes, than if it had been necessary to restart totally the learning starting from the general law of ignition advance common to all the cylinders programmed in ignition microcomputer 1.

Finally, it will be noted that more than two operating zones, for example three, can be chosen as a function of the speed and the load of the engine. There can be a "noncritical zone" in which the ignition advance programmed in microcomputer 1 is never modified and "slightly critical" and "very critical" zones in which, in response to the detection of pinging, the ignition advance is delayed by different values, for example twice as low in the "slightly critical" zone as in the "very critical" zone.

Obviously, numerous (additional) modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. Process for optimizing the ignition advance of an internal combustion engine equipped with a computer containing a programmed law for ignition advance as a function of the speed and the load of the engine and a system for detection of pinging that supplies data representative of the presence or absence of pinging for each engine stroke, according to which there is determined, as a function of the speed and the load of the engine, at least two operating zones, namely a critical zone and a noncritical zone and, in the case of detection of pinging in the critical zone, the ignition advance generated during at least one of the following engine strokes is delayed, comprising the following steps in response to the detection of pinging of a cylinder in the critical zone concerned:

delaying the ignition advance of the cylinder concerned by $n_1+n_2$ degrees in relation to the programmed law of advance; and controlling the return of the programmed advance of said cylinder at a fast rate and a slow rate by decrement of $n_1$ at a high speed and of $n_2$ at a low speed respectively;

wherein said process further comprises the following steps in response to a fast rate correction occurring during a passage from the critical zone to the noncritical zone;

cancelling said fast rate correction occurring during said passage from the critical zone to the noncritical zone;

storing the value of $n_2$ occurring during a passage from the critical zone to the noncritical zone; and suspending the advance correction and the decrement of $n_2$ at the slow rate until the following passage from the noncritical zone to the critical zone where the correction and the decrement of $n_2$ at the slow rate is resumed.

2. Process as in claim 1, wherein in response to the detection of pinging of a cylinder in the noncritical zone, the ignition advance of the cylinder concerned is delayed by $n_1$ degrees and a gradual reduction of this delay is controlled at the fast rate by decrement of $n_1$ at high speed.

3. Process as in either of claims 1 or 2, wherein $n_1$ is preferably between 3 and 8 degrees and is decremented at the fast rate at a rate of one degree every $m_1$ engine strokes, $m_1$ being preferably between 12 and 25, and wherein $n_2$ is preferably equal to 1 and is decremented at the slow rate at a rate of one degree every $m_2$ engine strokes, $m_2$ being preferably between 300 and about 65,000.

4. Process as in claim 1, wherein said programmed law of advance is common to all the cylinders of the engine and wherein each cylinder is treated individually with regard to the detection of pinging and the correction in said slow and/or fast rates of programmed advance.

5. Process as in claim 1, wherein, during a passage from the noncritical zone to the critical zone, a cumulative acceleration correction is performed with the corrections of the slow and fast rates by delaying the ignition advance by $n_3$ degrees for all the cylinders, $n_3$ being preferably between 4 and 8, and this delay is cancelled by $n_3$ degrees at the end of $m_3$ engine strokes, $m_3$ being preferably between 12 and 25, and wherein, during a passage from the critical zone to the noncritical zone, any acceleration correction in progress is cancelled.

6. Process as in claim 1, wherein, the system for detection of pinging comprises an accelerometer fastened rigidly on the cylinder head of the engine, and the accelerometric signal comprising, among other things, the integration of said signal inside an angular window of determined size is subjected to analog processing, the integrated signal is converted into digital form, and successively for each cylinder, the accelerometric value integrated and converted into digital form is compared at a comparison threshhold, the result of this comparision constituting said data.

7. Process as in claim 6, wherein said comparison threshhold of the cylinder concerned is equal to $S=a\bar{x}_n+b$ in which a and b are constants and $\bar{x}_n$ is the average value of the integrated accelerometric value $x_n$ representative of the engine noise for a given cylinder, $\bar{x}$ being computed for each cylinder at each stroke in the absence of detection of pinging.

8. Process as in claim 7, wherein:

$$\bar{x}_n = \bar{x}_{n-1} + 1/K(x_n - \bar{x}_{n-1})$$

where $x_n$ is the accelerometric value integrated in the last angular window;

$\bar{x}_n$ is the average value of the noise after this last angular window; and K is a filtering constant which takes a first value if $x_n > \bar{x}_{n-1}$ and a second value if $x_n \leq \bar{x}_{n-1}$ 9. Process as in claim 7, wherein:
the value $(\bar{x}_{n-1} - \Delta)$ is given to $x_n$ if $$x_n \, \bar{x}_{n-1} - \frac{\bar{x}_{n-1}}{4},$$

$\Delta$ being a fixed constant value,
the value $\bar{x}_{n-1}$ is given to $\bar{x}_n$ if $$\bar{x}_{n-1} > x_n \geq \bar{x}_{n-1} - \frac{\bar{x}_{n-1}}{4},$$

and the value $\bar{x}_n + \bar{n}_{n-1}$ is given to $x_n$ if $x_n \geq \bar{x}_{n-1}$.

10. Process as in any one of claims 7 to 9, wherein if the integrated accelerometric value $x_n$ is lower than a given threshhold and remains identical from one cylinder to another during a number of strokes or predetermined angular windows, the ignition advance of said programmed law is delayed by a number $n_4$ of degrees for all the cylinders of the engine.

11. Process as in claim 1, wherein a third operating zone in which the ignition advance according to the programmed law is never modified, is determined as a function of the speed and the load of the engine.

12. Process as in claim 1, wherein, in case the engine is stopped, the value of $n_2$ for each cylinder is stored and said stored value of $n_2$ is taken into account again during the restarting of the engine.

13. Process as in claim 1, wherein, in case the engine is stopped, the value of $n_2$ for each cylinder which corresponds to the smallest offset is stored and, for all the other cylinders, said stored value of $n_2$ is taken into account again during the restarting of the engine.

* * * * *